United States Patent
Pei

(10) Patent No.: US 12,477,335 B2
(45) Date of Patent: Nov. 18, 2025

(54) METHOD AND SYSTEM FOR PERFORMING TASK IN ACCESS CONTROL DEVICE

(71) Applicant: ARMATURA LLC, Alpharetta, GA (US)

(72) Inventor: Fang Pei, Sunnyvale, CA (US)

(73) Assignee: ARMATURA LLC, Alpharetta, GA (US)

( * ) Notice: Subject to any disclaimer, the term of this patent is extended or adjusted under 35 U.S.C. 154(b) by 320 days.

(21) Appl. No.: 18/296,187

(22) Filed: Apr. 5, 2023

(65) Prior Publication Data

US 2024/0340645 A1  Oct. 10, 2024

(51) Int. Cl.
*H04W 12/08* (2021.01)
*H04W 12/06* (2021.01)
*H04W 12/47* (2021.01)
*H04W 12/64* (2021.01)

(52) U.S. Cl.
CPC ........... *H04W 12/08* (2013.01); *H04W 12/06* (2013.01); *H04W 12/47* (2021.01); *H04W 12/64* (2021.01)

(58) Field of Classification Search
CPC ..... H04W 12/06; H04W 12/08; H04W 12/47; H04W 4/022–023; H04W 4/80; G06F 21/30; G06F 21/32–33; G06F 2221/2111
See application file for complete search history.

(56) References Cited

U.S. PATENT DOCUMENTS 9,444,805 B1 * 9/2016 Saylor ...................... H04L 63/08
11,354,956 B2 * 6/2022 Ufkes ................. G07C 9/00571
2012/0282921 A1 * 11/2012 Motola .................... H04W 4/14
  455/426.1
2014/0266585 A1 * 9/2014 Chao ......................... G07C 9/27
  340/5.61
2014/0266586 A1 * 9/2014 Fisher .................... H04W 12/06
  340/5.61
2015/0279130 A1 * 10/2015 Robertson .......... G07C 9/00904
  340/5.61

(Continued)

OTHER PUBLICATIONS

Tran et al. "The Distance to the Ideal Alternative (DiA) Algorithm for Interface Selection in Heterogeneous Wireless Networks" [Online], Oct. 30, 2008[Retrieved on: Apr. 19, 2025], ACM MobiWac2008, Retrieved from: < https://dl.acm.org/doi/pdf/10.1145/1454659.1454671 > (Year: 2008).*

*Primary Examiner* — Eric W Shepperd

(57) ABSTRACT

Embodiments herein disclose a mobile access control system (1000) and method. The system (1000) comprises a mobile device (200), an access control device (300) and a credential management server (100). The mobile device (200) sends an access credential request message for the user to a credential management server (100), receives the credential data and a wireless communication range based on the user from the server (100), verifies the user based on a match between the credential data received from the server (100) and the credential data of the user stored in the mobile device (200), activates an access control application in the mobile device (200), and encrypts the received data. The access control device (300) establishes a connection with the mobile device (200) and receives the encrypted data from the mobile device (200) using the short-range wireless communication, decrypts the encrypted data, and controls the access to the secured area.

16 Claims, 6 Drawing Sheets

(56) References Cited

U.S. PATENT DOCUMENTS

| | | | | |
|---|---|---|---|---|
| 2017/0142590 A1* | 5/2017 | Kremer | ............... | H04W 12/06 |
| 2018/0144563 A1* | 5/2018 | Reymann | ............... | E05F 15/76 |
| 2019/0020985 A1* | 1/2019 | Dai | ..................... | H04W 8/26 |
| 2019/0098504 A1* | 3/2019 | Van Betsbrugge | .. | G06Q 10/087 |
| 2019/0297089 A1* | 9/2019 | Bryant | ................ | G01S 11/06 |
| 2020/0372733 A1* | 11/2020 | Read | .................... | G07C 9/20 |
| 2025/0037526 A1* | 1/2025 | Babay Rouis | .......... | G07C 9/27 |

\* cited by examiner

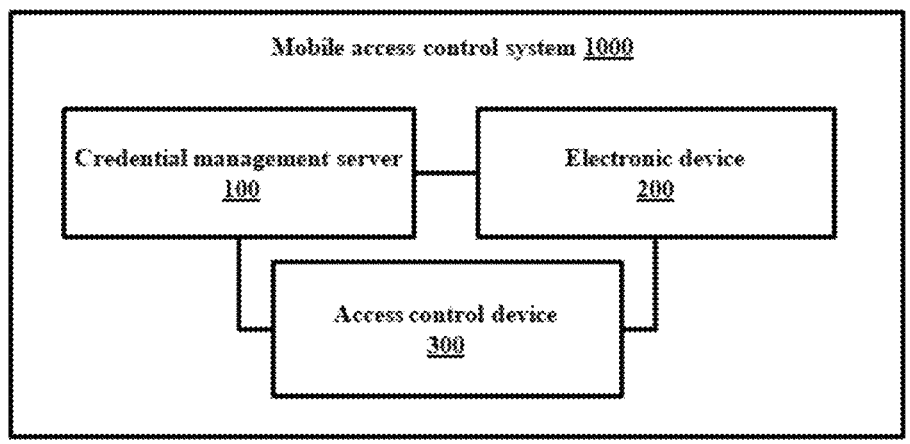
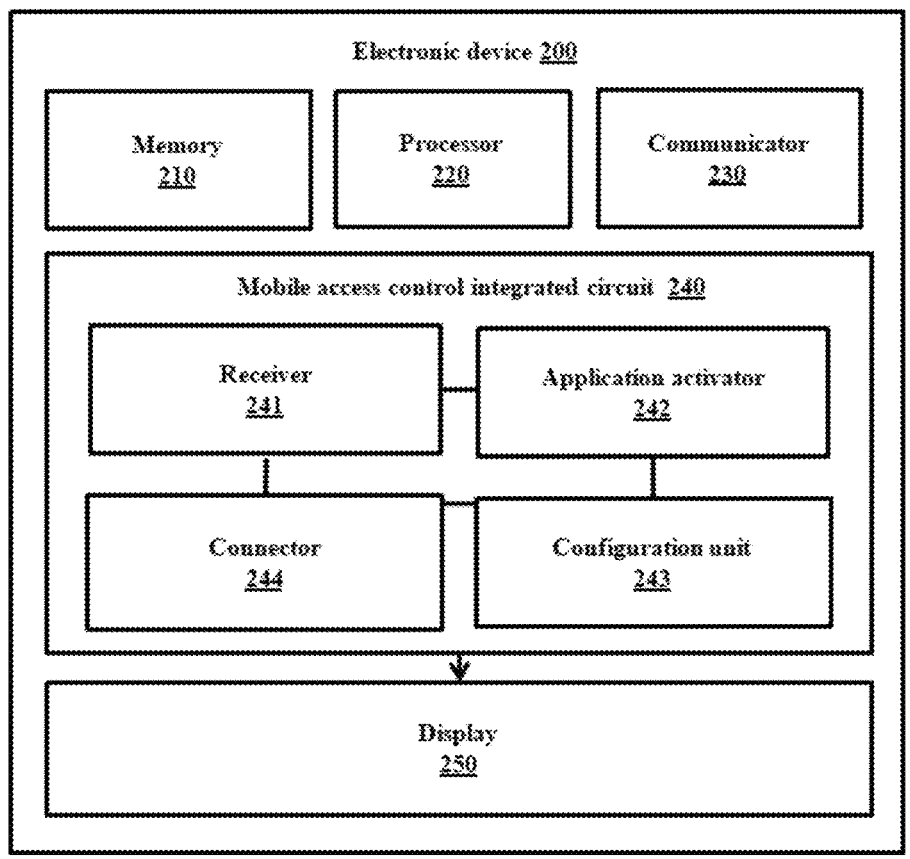

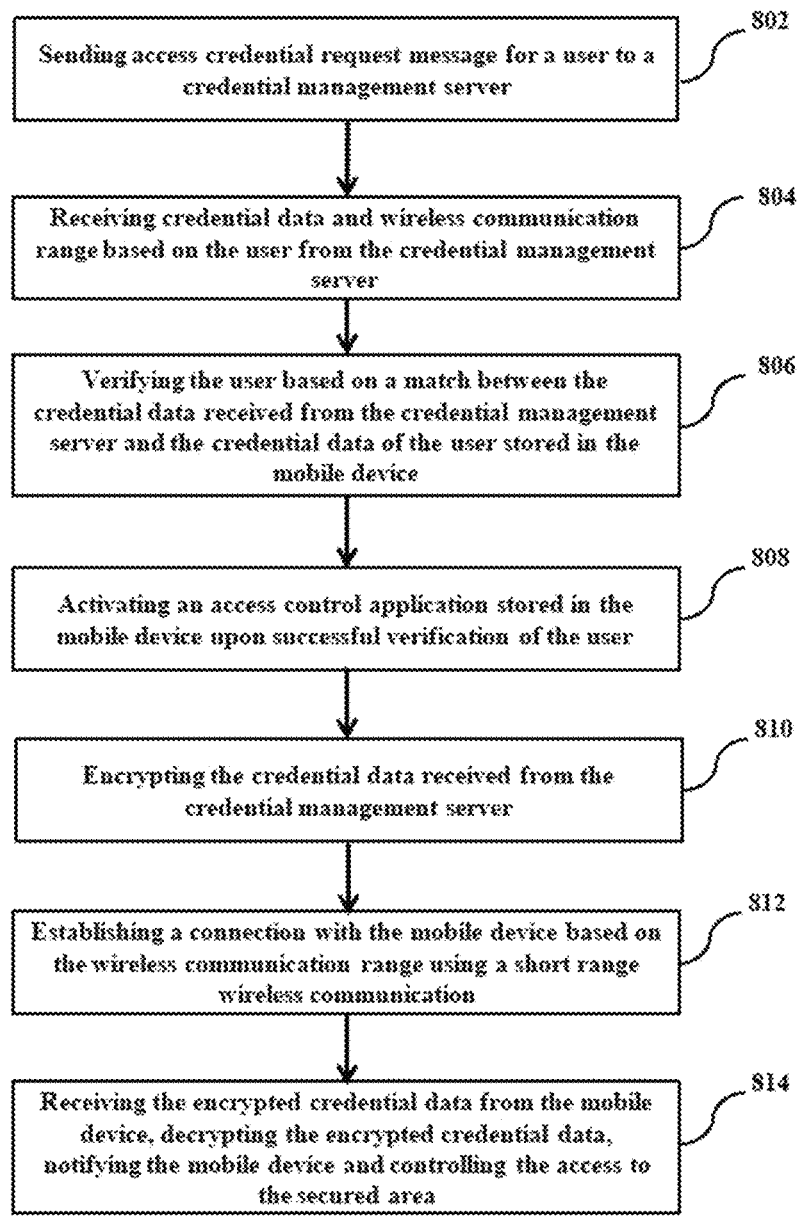

METHOD AND SYSTEM FOR PERFORMING TASK IN ACCESS CONTROL DEVICE

FIELD OF INVENTION

The present disclosure relates to access control, and more particularly to a method and a system for performing a task in an access control device.

BACKGROUND

In general, access control is a fundamental part of data security that dictates who is allowed to access and use private information and resources. The access control can also be applied to limit unauthorized physical access to a property or restrict entrance to secured areas. The access control has always been extremely important for life safety and personal assets of organizations. Mechanical or electronic door locks having keypads and passwords, radio frequency identification (RFID) devices and biometric data are currently available in order to prevent the unauthorized access in personal/official/restricted premises such as homes, research labs, banks, stores, etc.

Conventional systems are designed to monitor an area in front of a door in real-time using a camera and face recognition features, and notify a system administrator if anyone spends more than a specified time in front of the door. Generally, registered users have allowed by these systems to access and unlock the door through a mobile application, as the identification of the registered users may be done by face recognition, password, or fingerprint, subject of availability. However, the conventional systems focus mainly on the access control of the secured areas e.g. a company by setting a predefined range to the registered users, where the set range cannot be changed for different users for example an employee working in the company and for a person who is going to attend an interview with that company. In such case, the person who is going to attend the interview can access the secured area anytime, which may lead to theft of the private information and the resources of the company.

Thus, it is desired to address the above mentioned disadvantages or other shortcomings or at least provide a useful alternative.

OBJECT OF INVENTION

The principal object of the embodiments herein is to provide a method and a system for performing a task in an access control device. The system includes a mobile device to receive the credential data from the credential management server and activate an access control application in the mobile device for allowing a user to enter a secured area. Therefore, the system ensures secure access control to the secured area in a reliable and faster manner within a predetermined distance/range. The proposed system controls access to the secured area in a user friendly manner.

Another object of the embodiments herein is to provide an access control device to receive the credential data from the mobile device using the wireless communication, decrypt the received credential data and provide the access to the user for entering the secured area.

Another object of the embodiments herein is to activate an administration application in the mobile device for performing entire device configuration including but not limited to firmware update, communication type, lighting setting etc., of the access control device, by providing login credentials to the user, when the user is registered.

SUMMARY

Accordingly the embodiments herein disclose a mobile access control system. The mobile access control system includes an access control device, a credential management server and a mobile device. The access control device is deployed in a secured area. The credential management server stores credential data of a plurality of users to provide access to the secured area, and a plurality of wireless communication ranges to share the credential data of the user to the access control device. The mobile device is communicatively coupled to the credential management server. The mobile device includes a memory, a processor, and a mobile access control integrated circuit connected to the memory and the processor. The mobile access control integrated circuit is configured to send an access credential request message for the user to the credential management server, receive the credential data and a wireless communication range of the plurality of wireless communication ranges based on the user from the credential management server, verify the user based on a match between the credential data received from the credential management server and the credential data of the user stored in the mobile device, activate an access control application stored in the mobile device upon successful verification of the user, and encrypt the credential data received from the credential management server. The access control device includes a short range communication controller to establish a connection with the mobile device based on the wireless communication range using a short range wireless communication, and a secured area control circuit that receives the encrypted credential data from the mobile device using the short range wireless communication, decrypts the encrypted credential data, and controls the access to the secured area.

In an embodiment, the credential management server is configured to receive the access credential request message for the user from the mobile device, determine an identity of the user based on the received access credential request message for the user, determine a distance between the mobile device and the access control device deployed in the secured area, select the wireless communication range of the plurality of the wireless communication ranges based on the identity of the user and the distance between the mobile device and the access control device, where the wireless communication range is used by the mobile device to establish the connection with the access control device, and send the credential data and the selected wireless communication range to the mobile device.

In an embodiment, the mobile device is configured to display an administration application stored in the mobile device, receive an input to configure at least one parameter of the access control device using the administration application, where at least one parameter of the access control device includes a firmware update/upgrade, access distance setting, lighting setting, and a timer alarm setting, generate an access control device configuration based on the input, and send the access control device configuration to the access control device.

In an embodiment, the access control device controls the access to the secured area by sending the access request message for the user to the credential management server upon decryption of the encrypted credential data received from the mobile device, receiving the credential data of the user from the credential management server, verifying the user by comparing the decrypted credential data and the credential data received from the credential management server, and allowing access to the secured area when the user is successfully verified.

In an embodiment, the mobile device establishes the connection with the access control device using the wireless communication range of the short range wireless communication by: displaying a graphical interface on a screen of the mobile device, wherein the graphical interface comprises an intractable item to remotely establish the connection between the mobile device and the access control device, receiving an input on the displayed intractable item from the user of the mobile device to establish the connection, and establishing the connection with the access control device based on the wireless communication range using the short range wireless communication when the input is received by the mobile device.

In an embodiment, the mobile device establishes the connection with the access control device using the wireless communication range of the short range wireless communication by: displaying a unique code on a screen or display of the mobile device, where the unique code holds information about the mobile device to establish the connection between the mobile device and the access control device, scanning the unique code display on the screen of the mobile device using the short range wireless communication, where the mobile device is placed at a distance of the wireless communication range from the access control device, and establishing the connection with the access control device based on the scan.

In an embodiment, the mobile device establishes the connection with the access control device using the wireless communication range of the short range wireless communication by: detecting whether the mobile device is at a distance of the wireless communication range from the access control device, automatically sending a signal from the mobile device to the access device to establish contactless connection with the access control device, and establishing the connection with the access control device based on the signal.

Accordingly the embodiments herein disclose a mobile access control method including deploying the access control device in a secured area, setting up the credential management server that stores credential data of a plurality of users to provide access to the secured area, and the plurality of wireless communication ranges to share the credential data of the user to the access control device, and communicatively coupling the mobile device to the credential management server. The mobile device is configured for sending the access credential request message for the user to the credential management server, receiving the credential data and the wireless communication range of the plurality of wireless communication ranges based on the user from the credential management server, verifying the user based on the match between the credential data received from the credential management server and the credential data of the user stored in the mobile device; activating the access control application stored in the mobile device upon successful verification of the user, and encrypting the credential data received from the credential management server. The access control device is configured for establishing the connection with the mobile device based on the wireless communication range using the short range wireless communication, receiving the encrypted credential data from the mobile device using the short range wireless communication, decrypting the encrypted credential data, and controlling the access to the secured area.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the invention thereof, and the embodiments herein include all such modifications.

BRIEF DESCRIPTION OF FIGURES

This invention is illustrated in the accompanying drawings, throughout which like reference letters indicate corresponding parts in the various figures. The clean-copy embodiments herein will be better understood from the following description with reference to the drawings, in which:

FIG. 1 is a block diagram of a system for performing a task in an access control device, according to the embodiments as disclosed herein;

FIG. 2 is a block diagram of an electronic device in the system, according to the embodiments as disclosed herein;

FIG. 8 is a flow chart illustrating a mobile access control method, according to the embodiments as disclosed herein.

DETAILED DESCRIPTION OF INVENTION

Figure 3:
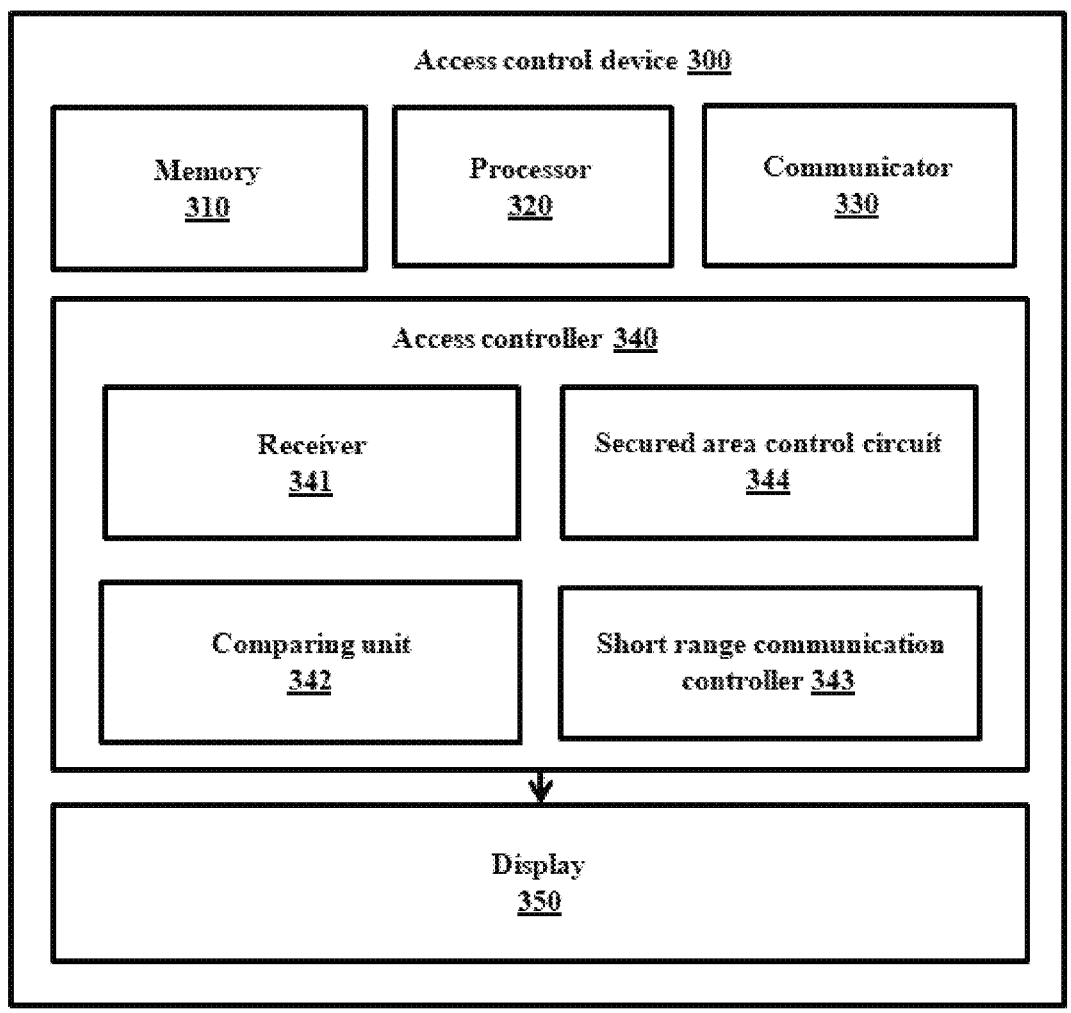
FIG. 3 is a block diagram of the access control device, according to the embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hard-wired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Accordingly the embodiments herein disclose a mobile access control system. The mobile access control system includes an access control device deployed in a secured area, a credential management server that stores credential data of a plurality of users to provide access to the secured area, and a plurality of wireless communication ranges to share the credential data of the user to the access control device, and a mobile device communicatively coupled to the credential management server. The mobile device includes a memory, a processor, and a mobile access control integrated circuit connected to the memory and the processor and configured to send an access credential request message for the user to the credential management server, receive the credential data and a wireless communication range of the plurality of wireless communication ranges based on the user from the credential management server, verify the user based on a match between the credential data received from the credential management server and the credential data of the user stored in the mobile device, activate an access control application stored in the mobile device upon successful verification of the user, and encrypt the credential data received from the credential management server. The access control device includes a short range communication controller to establish a connection with the mobile device based on the wireless communication range using a short range wireless communication, and a secured area control circuit that receives the encrypted credential data from the mobile device using the short range wireless communication, decrypts the encrypted credential data, and controls the access to the secured area.

Accordingly the embodiments herein disclose a mobile access control method including, by the mobile device, sending an access credential request message for the user to the credential management server, receiving the credential data and the wireless communication range of the plurality of wireless communication ranges based on the user from the credential management server, verifying the user based on the match between the credential data received from the credential management server and the credential data of the user stored in the mobile device, activating the access control application stored in the mobile device upon successful verification of the user, and encrypting the credential data received from the credential management server. The method also includes, by the access control device, establishing a connection with the mobile device based on the wireless communication range using the short range wireless communication, receiving the encrypted credential data from the mobile device using the short range wireless communication, decrypting the encrypted credential data, and controlling the access to the secured area.

Conventional methods and systems securely update firmware of locking devices. The conventional method includes receiving a lock identifier from the locking device; and determining that the lock identifier is associated with a user profile by comparing the lock identifier to a set of lock identifiers. The conventional method also includes receiving a firmware update packet from a server, where the firmware packet is encrypted by a lock key; and transmitting the firmware update packet to the lock. Further, the conventional method includes decrypting the firmware update using the lock key; validating the encrypted firmware update; and installing the firmware update. However, the conventional methods and systems fail to activate an administration application in the electronic device and update the firmware of the access control device.

Conventional methods and systems configure small locking systems e.g. electronic locking cylinders with electronic locks, by preferably communicating with passive radio frequency identification (RFID) cards. The conventional methods and systems allow easy configuration of the locks/locking cylinders, and corresponding RFID cards, by using a smartphone. However, the conventional methods and systems mainly focuses on the configuration of the locks/locking cylinders with the electronic locks, but do not receive the credential data from the server and activate the access control application in the mobile device for accessing the secured area.

Unlike to the conventional methods and systems, the proposed system receives the credential data from the credential management server and activates the access control application in the mobile device for accessing the secured area. Further, the proposed system configures a parameter of the access control device using an administration application in the mobile device. Therefore, the proposed system performs two tasks based on the user preference. Further, the proposed system includes an option for setting different access ranges for different users for accessing the secured areas.

Referring now to the drawings and more particularly to FIGS. 1 through 7, where similar reference characters denote corresponding features consistently throughout the figure, these are shown preferred embodiments.

FIG. 1 is a block diagram of a system (1000) for performing a task in an access control device (300), according to the embodiments as disclosed herein.

In an embodiment, the system (1000) includes a credential management server (100), an electronic device (200) and the access control device (300).

In an embodiment, the credential management server (100) is configured for storing credential data of a plurality of users of the system (1000). The credential management server (100) is configured for receiving an access credential request message for the user from the electronic device (200). The access credential request message is received to verify the user for entry to the secured area. The credential management server (100) determines an identity of the user based on the received access credential request message for the user. The credential management server (100) determines a distance between the electronic device (200) and the access control device (300) deployed in a secured area. The secured area includes but not limited to an office, a school, a hospital, and business facilities. Further, the credential management server (100) selects a wireless communication range of the plurality of the wireless communication ranges based on the identity of the user and the distance between the electronic device (200) and the access control device (300), where the wireless communication range is used by the electronic device (200) to establish the connection with the access control device (300). The credential management server (100) sends the credential data and the selected wireless communication range to the electronic device (200).

In an embodiment, the electronic device (200) is connected to the credential management server (100). The electronic device (200) may be but not limited to a mobile device, a laptop, a palmtop, a desktop, a mobile phone, a smart phone, Personal Digital Assistant (PDA), a tablet, a wearable device, an Internet of Things (IoT) device, a virtual reality device, a foldable device, a flexible device, a display device and an immersive system.

In an embodiment, the access control device (300) is connected to the credential management server (100) and the electronic device (200). The access control device (300) is deployed in the secured area. The access control device (300) may be but not limited to a biometric control device to provide a complementary access control by biometrics, an image capture device to provide a complementary access control by facial recognition, and a keyboard in order to provide a complementary access control by entering a pass code.

FIG. 2 is a block diagram of the electronic device (200) of the system (1000) for performing the task in the access control device (300), according to the embodiments as disclosed herein.

Referring to FIG. 2, the electronic device (200) includes a memory (210), a processor (220), a communicator (230), a mobile access control integrated circuit (240) and a display (250).

The memory (210) is configured to store the credential data of the user. The memory (210) can include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (210) may, in some examples, be considered a non-transitory storage medium. The term "non-transitory" may indicate that the storage medium is not embodied in a carrier wave or a propagated signal. However, the term "non-transitory" should not be interpreted that the memory (210) is non-movable. In some examples, the memory (210) is configured to store larger amounts of information. In certain examples, a non-transitory storage medium may store data that can, over time, change (e.g., in Random Access Memory (RAM) or cache).

The processor (220) may include one or a plurality of processors. The one or the plurality of processors may be a general-purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The processor (220) may include multiple cores and is configured to verify an authenticity of the credential data stored in the memory (210).

In an embodiment, the communicator (230) includes an electronic circuit specific to a standard that enables wired or wireless communication. The communicator (230) is configured to communicate internally between internal hardware components of the electronic device (200) and with external devices via one or more networks.

In an embodiment, the mobile access control integrated circuit (240) is connected to the memory (210) and the processor (220). The mobile access control integrated circuit (240) includes a receiver (241), an application activator (242), a configuration unit (243) and a connector (244).

In an embodiment, the receiver (241) is configured to receive the credential data from the credential management server (100).

In an embodiment, the application activator (242) is configured to send the access credential request message for the user to the credential management server (100) and receive the credential data and the wireless communication range of the plurality of wireless communication ranges based on the user from the credential management server (100). The application activator (242) is configured to verify the user based on the match between the credential data received from the credential management server (100) and the credential data of the user stored in the electronic device (200). The application activator (242) is configured to activate an access control application/administration application in the electronic device (200) upon successful verification of the user, and encrypt the credential data received from the credential management server (100).

In an embodiment, the configuration unit (243) is implemented to display the administration application stored in the electronic device (200). The configuration unit (243) receives an input to configure at least one parameter of the access control device (300) using the administration application. The parameter of the access control device (300) includes but not limited to a firmware update/upgrade, access distance setting, lighting setting, and a timer alarm setting. The configuration unit (243) generates an access control device configuration based on the received input and sends the access control device configuration to the access control device (300).

The connector (244) establishes connection with the access control device (300) in four modes using the wireless communication range of the short range wireless communication for accessing the secured area. The four modes include but not limited to a card mode, a Quick Response (QR) code mode, a remote mode and an express mode.

In the card mode and the express mode, the connector (244) detects whether the electronic device (200) is at a distance of the wireless communication range from the access control device (300), and automatically sends a signal from the electronic device (200) to the access device (300) to establish contactless connection with the access control device (300). The connector (244) establishes the connection with the access control device (300) based on the signal sent from the electronic device (200).

In remote mode, the connector (244) displays a graphical interface on the screen/display (250) of the electronic device (200). The graphical interface includes an intractable item to remotely establish the connection between the electronic device (200) and the access control device (300). The connector (244) receives an input on the displayed intractable item from the user of the electronic device (200) to establish the connection. Thereby establishing connection with the access control device (300) based on the wireless communication range using the short range wireless communication when the input is received by the electronic device (200).

In QR code mode, the connector (244) displays a unique code on the screen/display (250) of the electronic device (200). The unique code holds information about the electronic device (200) to establish the connection between the electronic device (200) and the access control device (300). The connector (244) scans the unique code display on the display of the electronic device (200) using the short range wireless communication, where the electronic device (200) is placed at a distance of the wireless communication range from the access control device (300). Thereby establishing the connection with the access control device (300) based on the scan of the unique code.

The mobile access control integrated circuit (240) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

In an embodiment, the display (250) is configured to display the unique code for accessing the secured area. The display (250) is implemented using touch sensitive technology and comprises one of liquid crystal display (LCD), light emitting diode (LED), etc.

Although the FIG. 2 show the hardware elements of the electronic device (200) but it is to be understood that other embodiments are not limited thereon. In other embodiments, the electronic device (200) may include less or more number of elements. Further, the labels or names of the elements are used only for illustrative purpose and does not limit the scope of the invention. One or more components can be combined together to perform same or substantially similar function.

FIG. 3 is a block diagram of the access control device (300), according to the embodiments as disclosed herein.

Referring to FIG. 3, the access control device (300) includes a memory (310), a processor (320), a communicator (330), an access controller (340) and a display (350).

The memory (310) is configured to store the credential data of the user. The memory (310) can include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (310) may, in some examples, be considered a non-transitory storage medium. The term "non-transitory" may indicate that the storage medium is not embodied in a carrier wave or a propagated signal. However, the term "non-transitory" should not be interpreted that the memory (310) is non-movable. In some examples, the memory (310) is configured to store larger amounts of information. In certain examples, a non-transitory storage medium may store data that can, over time, change (e.g., in Random Access Memory (RAM) or cache).

The processor (320) may include one or a plurality of processors. The one or the plurality of processors may be a general-purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The processor (320) may include multiple cores and is configured to verify an authenticity of the credential data stored in the memory (310).

In an embodiment, the communicator (330) includes an electronic circuit specific to a standard that enables wired or wireless communication. The communicator (330) is configured to communicate internally between internal hardware components of the access control device (300) and with external devices via one or more networks.

In an embodiment, the access controller (340) includes a receiver (341), a comparing unit (342), a short range communication controller (343) and a secured area control circuit (344).

In an embodiment, the receiver (341) is configured for receiving the credential data from the electronic device (200) and also the credential data from the credential management server (100).

In an embodiment, the comparing unit (342) is configured for comparing the credential data received from the mobile device (200) with the credential data received from the credential management server (100) to control access to the secured area.

In an embodiment, the short range communication controller (343) is configured to establish a connection with the electronic device (200) based on the wireless communication range using the short range wireless communication when the credential data received from the electronic device (200) and the credential data received from the credential management server (300) are matched.

In an embodiment, the secured area control circuit (344) receives the encrypted credential data from the application activator (242) of the electronic device (200) using the short range wireless communication. The secured area control circuit (344) decrypts the encrypted credential data, and controls the access to the secured area.

The secured area control circuit (344) controls the access to the secured area by sending the access request message for the user to the credential management server (100) upon decryption of the encrypted credential data received from the application activator (242) of the electronic device (200). The secured area control circuit (344) receives the credential data of the user from the credential management server (100) and verifies the user by comparing the decrypted credential data and the credential data received from the credential management server (100). Thereby allowing access to the secured area when the user is successfully verified.

Although the FIG. 3 shows the hardware elements of the access control device (300) but it is to be understood that other embodiments are not limited thereon. In other embodiments, the access control device (300) may include less or more number of elements. Further, the labels or names of the elements are used only for illustrative purpose and does not limit the scope of the invention. One or more components can be combined together to perform same or substantially similar function.

Figure 4:
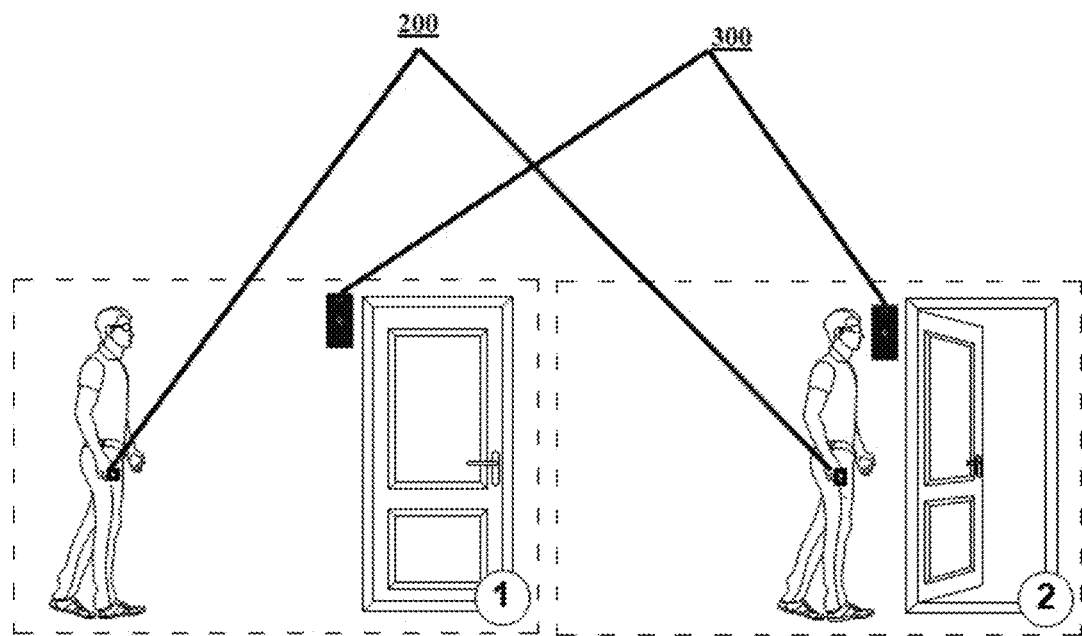
FIG. 4 illustrates an example scenario of controlling an access of a user by the system, according to the embodiments as disclosed herein.

FIG. 4 illustrates an example scenario of controlling the access of the user by the system (100), according to the embodiments as disclosed herein.

Referring to FIG. 4, considering a scenario that the user is walking to enter the secured area using the card mode and/or the express mode. The user has the mobile device (200) inside a bag or a pocket. When the access control application is installed or activated in the users mobile device (200) using the credential data received from the credential management server (100), the user can access the access control device (300) to enter into the secured area without taking out the mobile device (200) from the bag or the pocket.

Figure 5:
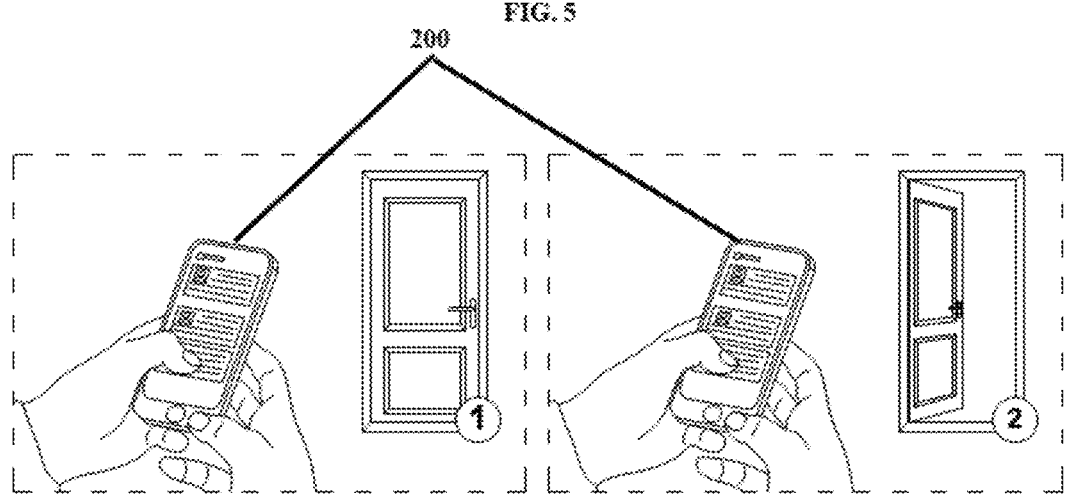
FIG. 5 is a schematic view illustrating the process of accessing a secured area using a mobile application, according to the embodiments as disclosed herein.

FIG. 5 is a schematic view illustrating the process of accessing the secured area using the mobile application, according to the embodiments as disclosed herein.

Referring to FIG. 5, considering a scenario that the user is on his way to enter the secured area. When the access control application is installed or activated in the users mobile device (200) using the credential data received from the credential management server (100), the user can access the access control device (300) by simply tapping the mobile device (200), to enter into the secured area.

Figure 6:
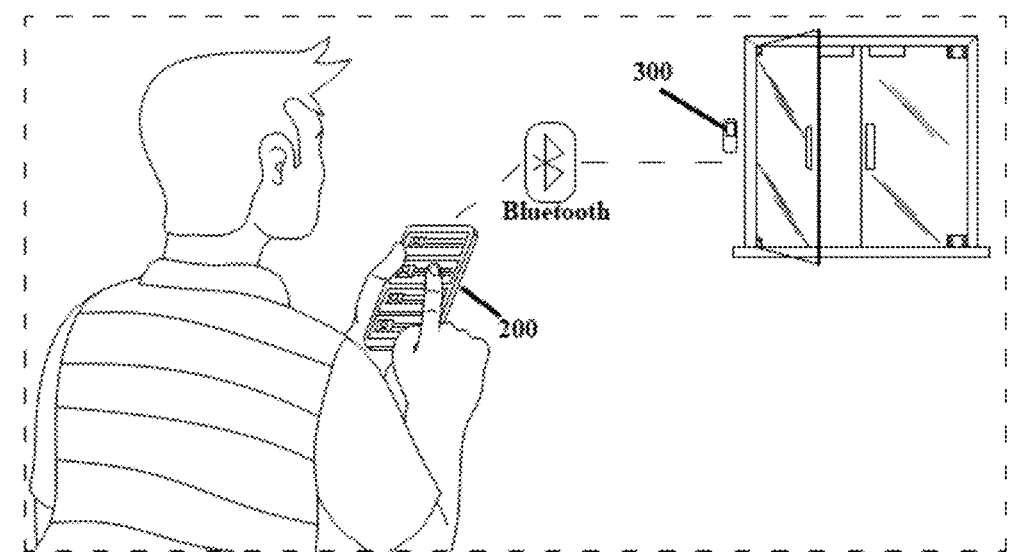
FIG. 6 is a schematic view illustrating the process of accessing the secured area using wireless communication, according to the embodiments as disclosed herein.

FIG. 6 is a schematic view illustrating the process of accessing the secured area using the wireless communication, according to the embodiments as disclosed herein.

Referring to FIG. 6, in the remote mode, the user can experience remotely unlocking of the access control device (300) by clicking or pressing a button in the access control application activated in the mobile device (200) for contactless long distance access. During the contactless long distance access, the mobile access control integrated circuit (240) sends the access credential request message for the user to the credential management server (100) and receives the credential data and the wireless communication range of the plurality of wireless communication ranges based on the user from the credential management server (100). The mobile access control integrated circuit (240) verifies the user based on a match between the credential data received from the credential management server (100) and the credential data of the user stored in the mobile device (200). The mobile access control integrated circuit (240) activates the access control application stored in the mobile device (200) upon successful verification of the user and encrypts the credential data received from the credential management server (100). Further, the mobile access control integrated circuit (240) detects whether the mobile device (100) is at a distance of the wireless communication range from the access control device (300) and automatically sends a signal from the mobile device (200) to the access control device (300) to establish contactless connection with the access control device (300).

The access control device (300) includes the short range communication controller (343) to establish the contactless connection with the access control device (300) based on the signal received from the mobile access control integrated circuit (240). The secured area control circuit (344) is configured to receive the encrypted credential data from the mobile access control integrated circuit (240) of the mobile device (200) using the short range wireless communication, decrypt the encrypted credential data, and control the access to the secured area.

The access control device (300) is unlocked by the wireless technology. Thereby satisfying the needs of long-distance operation. The wireless technology includes but not limited to Bluetooth Low Energy (BLE), Near Field Communication (NFC), and Wireless Fidelity (WI-FI).

Figure 7:
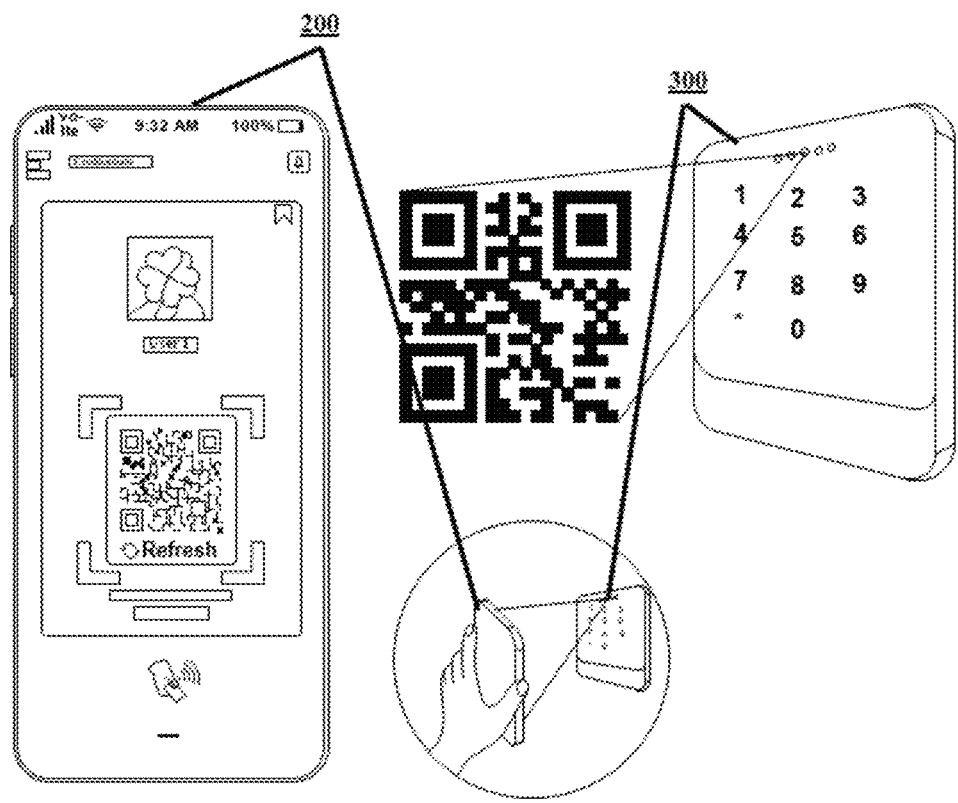
FIG. 7 is a schematic view illustrating the process of accessing the secured area using Quick Response (QR) code mode, according to the embodiments as disclosed herein.

FIG. 7 is a schematic view illustrating the process of accessing the secured area using the QR code mode, according to the embodiments as disclosed herein.

Referring to FIG. 7, the access control application activated in the mobile device (200) includes the QR code credentials to access the access control device (300). With QR codes, the registered users are allowed to access the secured area by scanning the QR code. The access control device (300) automatically scans and verifies the QR code and allows access of the user to the secured area. The QR code will be automatically changed for every 30 seconds, thereby preventing sending or sharing the codes to unauthorized users for accessing the secured area.

FIG. 8 is a flow chart (200) illustrating a mobile access control method, according to the embodiments as disclosed herein.

Referring to the FIG. 8, at step 802, the method includes the mobile device (200) sending the access credential request message for the user to the credential management server (100). For example, in the mobile device (200) as illustrated in the FIG. 2, the mobile access control integrated circuit (240) is configured to send the access credential request message for the user to the credential management server (100).

At step 804, the method includes the mobile device (200) receiving the credential data and the wireless communication range of the plurality of wireless communication ranges based on the user from the credential management server (100). For example, in the mobile device (200) as illustrated in the FIG. 2, the mobile access control integrated circuit (240) is configured to receive the credential data and the wireless communication range of the plurality of wireless communication ranges based on the user from the credential management server (100).

At step 806, the method includes the mobile device (200) verifying the user based on a match between the credential data received from the credential management server (100) and the credential data of the user stored in the mobile device (200). For example, in the mobile device (200) as illustrated in the FIG. 2, the mobile access control integrated circuit (240) is configured to verify the user based on a match between the credential data received from the credential management server (100) and the credential data of the user stored in the mobile device (200).

At step 808, the method includes the mobile device (200) activating the access control application stored in the mobile device (200) upon successful verification of the user. For example, in the mobile device (200) as illustrated in the FIG. 2, the mobile access control integrated circuit (240) is configured to activate the access control application stored in the mobile device (200) upon successful verification of the user.

At step 810, the method includes the mobile device (200) encrypting the credential data received from the credential management server (100). For example, in the mobile device (200) as illustrated in the FIG. 2, the mobile access control integrated circuit (240) is configured to encrypt the credential data received from the credential management server (100).

At step 812, the method includes the access control device (300) establishing the connection with the mobile device (200) based on the wireless communication range using the short range wireless communication. For example, in the access control device (300) as illustrated in the FIG. 3, the access controller (240) is configured to establish the connection with the mobile device (200) based on the wireless communication range using the short range wireless communication.

At step 814, the method includes the access control device (300) receiving the encrypted credential data from the mobile device (200) using the short range wireless communication, decrypts the encrypted credential data, notifies the mobile device (200) about successful verification of the decrypted credential data and controls the access to the secured area. For example, in the access control device (300) as illustrated in the FIG. 3, the access controller (240) is configured to receive the encrypted credential data from the mobile device (200) using the short range wireless communication, decrypt the encrypted credential data, and control the access to the secured area.

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the invention.

The foregoing description of the specific embodiments will so fully reveal the general nature of the embodiments herein that others can, by applying current knowledge, readily modify and or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

I claim:

1. A mobile access control system (1000) comprises:
   an access control device (300) deployed in a secured area;
   a credential management server (100) that stores credential data of a plurality of users to provide access to the secured area, and a plurality of wireless communication ranges to share the credential data of a user of the plurality of users to the access control device (300); and
   a mobile device (200) communicatively coupled to the credential management server (100), wherein the mobile device (200) comprises a memory (210), a processor (220), and a mobile access control integrated circuit (240) connected to the memory (210) and the processor (220), wherein the mobile access control integrated circuit (240):
     sends an access credential request message for the user to the credential management server (100);
     receives the credential data and a wireless communication range of the plurality of wireless communication ranges based on the user from the credential management server (100);
     verifies the user based on a match between the credential data received from the credential management server (100) and credential data of the user stored in the mobile device (200);
     activates an access control application stored in the mobile device (200) upon successful verification of the user; and
     encrypts the credential data received from the credential management server (100); and
   wherein the access control device (300) comprises:
     a communication controller (343) to establish a connection with the mobile device (200) based on the wireless communication range using a short range wireless communication, wherein the short range wireless communication comprises at least one of Bluetooth Low Energy (BLE), Near Field Communication (NFC), and Wireless Fidelity (WI-FI); and
     a secured area control circuit (344) that receives the encrypted credential data from the mobile device (200) using the short range wireless communication, decrypts the encrypted credential data, notifies the mobile device (200) about successful verification of the decrypted credential data and controls the access of the user to the secured area.

2. The mobile access control system (1000) as claimed in claim 1, wherein the credential management server (100) is configured to:
   receive the access credential request message for the user from the mobile device (200); determine an identity of the user based on the received access credential request message for the user;
   determine a distance between the mobile device (200) and the access control device (300) deployed in the secured area;
   select the wireless communication range of the plurality of the wireless communication ranges based on the identity of the user and the distance between the mobile device (200) and the access control device (300), wherein the wireless communication range is used by the mobile device (200) to establish the connection with the access control device (300); and
   send the credential data and the selected wireless communication range to the mobile device (200).

3. The mobile access control system (100) as claimed in claim 1, wherein the mobile device (200) is configured to:
   display an administration application stored in the mobile device (200);
   receive an input to configure at least one parameter of the access control device (300) using the administration application, wherein the at least one parameter of the access control device (300) comprises a firmware update/upgrade, an access distance setting, a lighting setting, and a timer alarm setting;
   generate an access control device configuration based on the input; and
   send the access control device configuration to the access control device (300).

4. The mobile access control system (1000) as claimed in claim 1, wherein the secured area control circuit (344) controls the access of the user to the secured area comprises:
   send the access request message for the user to the credential management server (100) upon decryption of the encrypted credential data received from the mobile device (200);
   receive the credential data of the user from the credential management server (100);
   verify the user by comparing the decrypted credential data and the credential data received from the credential management server (100); and
   allow access of the user to the secured area when the user is successfully verified.

5. The mobile access control system (1000) as claimed in claim 1, wherein establish the connection with the access control device (300) using the wireless communication range of the short range wireless communication comprises:
   display a graphical user interface on a display (250) of the mobile device (200), wherein the graphical user interface comprises an item to remotely establish the connection between the mobile device (200) and the access control device (300);
   receive an input on the displayed item from the user of the mobile device (200) to establish the connection; and
   establish the connection with the access control device (300) based on the wireless communication range using the short range wireless communication upon receiving the input.

6. The mobile access control system (1000) as claimed in claim 1, wherein establish the connection with the access control device (300) using the wireless communication range of the short range wireless communication comprises:
- display a unique code on the display (250) of the mobile device (200), wherein the unique code comprises information of the mobile device (200) to establish the connection between the mobile device (200) and the access control device (300);
- scan the unique code displayed on the display (250) of the mobile device (200) using the short range wireless communication, wherein the mobile device (200) is placed at a distance of the wireless communication range from the access control device (300); and
- establish the connection with the access control device (300) based on the scan.

7. The mobile access control system (1000) as claimed in claim 1, wherein establish the connection with the access control device (300) using the wireless communication range of the short range wireless communication comprises:
- detect whether the mobile device (200) is at a distance of the wireless communication range from the access control device (300);
- automatically send a signal from the mobile device (200) to the access control device (300) to establish contactless connection with the access control device (300); and
- establish the connection with the access control device (300) based on the signal.

8. A mobile access control method comprises:
- sending, by a mobile device (200) of a mobile access control system (1000), an access credential request message for a user to a credential management server (100);
- receiving, by the mobile device (200) of the mobile access control system (1000), credential data and a wireless communication range of a plurality of wireless communication ranges based on the user from the credential management server (100), wherein the credential management server (100) stores credential data of a plurality of users to provide access to a secured area, and the plurality of wireless communication ranges to share credential data of the user to an access control device (300);
- verifying, by the mobile device (200) of the mobile access control system (1000), the user based on a match between the credential data received from the credential management server (100) and the credential data of the user stored in the mobile device (200);
- activating, by the mobile device (200) of the mobile access control system (1000), an access control application stored in the mobile device (200) upon successful verification of the user;
- encrypting, by the mobile device (200) of the mobile access control system (1000), the credential data received from the credential management server (100);
- establishing, by the access control device (300) of the mobile access control system (1000), a connection with the mobile device (200) based on the wireless communication range using a short range wireless communication, wherein the short range wireless communication comprises at least one of Bluetooth Low Energy (BLE), Near Field Communication (NFC), and Wireless Fidelity (WI-FI); and
- receiving, by the access control device (300) of the mobile access control system (1000), the encrypted credential data from the mobile device (200) using the short range wireless communication, decrypting the encrypted credential data, notifying the mobile device (200) about successful verification of the decrypted credential data, and controlling the access to the secured area.

9. The mobile access control method as claimed in claim 8, wherein the access control device (300) is deployed in the secured area.

10. The mobile access control method as claimed in claim 8, wherein the mobile device (200) is communicatively coupled to the credential management server (100).

11. The mobile access control method as claimed in claim 8, wherein the method comprises configuring the credential management server (100) for:
- receiving the access credential request message for the user from the mobile device (200); determining an identity of the user based on the received access credential request message for the user;
- determining a distance between the mobile device (200) and the access control device (300) deployed in the secured area;
- selecting the wireless communication range of the plurality of the wireless communication ranges based on the identity of the user and the distance between the mobile device (200) and the access control device (300), wherein the wireless communication range is used by the mobile device (200) to establish the connection with the access control device (300); and
- sending the credential data and the selected wireless communication range to the mobile device (200).

12. The mobile access control method as claimed in claim 8, wherein the method comprises configuring the mobile device (200) for:
- displaying an administration application stored in the mobile device (200);
- receiving an input to configure at least one parameter of the access control device (300) using the administration application, wherein the at least one parameter of the access control device (300) comprises a firmware update/upgrade, access distance setting, lighting setting, and a timer alarm setting;
- generating an access control device configuration based on the input; and
- sending the access control device configuration to the access control device.

13. The mobile access control method as claimed in claim 8, wherein controlling the access to the secured area by the access control device (300) comprises:
- sending the access request message for the user to the credential management server (100) upon decryption of the encrypted credential data received from the mobile device (200);
- receiving the credential data of the user from the credential management server (100);
- verifying the user by comparing the decrypted credential data and the credential data received from the credential management server (100); and
- allowing access to the secured area when the user is successfully verified.

14. The mobile access control method as claimed in claim 8, wherein establishing the connection with the access control device (300) using the wireless communication range of the short range wireless communication comprises:
- displaying a graphical user interface on a display (250) of the mobile device (200), wherein the graphical user interface comprises an item to remotely establish the connection between the mobile device (200) and the access control device (300);
- receiving an input on the displayed item from the user of the mobile device (200) to establish the connection; and establishing the connection with the access control device (300) based on the wireless communication range using the short range wireless communication when the input is received by the mobile device (200).

15. The mobile access control method as claimed in claim 8, wherein establishing the connection with the access control device (300) using the wireless communication range of the short range wireless communication comprises:
- displaying a unique code on the display (250) of the mobile device (200), wherein the unique code comprises information of the mobile device (200) to establish the connection between the mobile device (200) and the access control device (300);
- scanning the unique code display on the screen of the mobile device (200) using the short range wireless communication, wherein the mobile device (200) is placed at a distance of the wireless communication range from the access control device (300); and
- establishing the connection with the access control device (300) based on the scan.

16. The mobile access control method as claimed in claim 8, wherein establishing the connection with the access control device (300) using the wireless communication range of the short range wireless communication comprises:
- detecting whether the mobile device (200) is at a distance of the wireless communication range from the access control device (300);
- automatically sending a signal from the mobile device (200) to the access control device (300) to establish contactless connection with the access control device (300); and
- establishing the connection with the access control device (300) based on the signal.

* * * * *